(12) United States Patent
Elshafie et al.

(10) Patent No.: US 12,256,214 B2
(45) Date of Patent: Mar. 18, 2025

(54) SIGNAL MODIFICATION FOR CONTROL CHANNEL PHYSICAL LAYER SECURITY

(71) Applicant: QUALCOMM Incorporated, San Diego, CA (US)

(72) Inventors: Ahmed Elshafie, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 17/659,319

(22) Filed: Apr. 14, 2022

(65) Prior Publication Data

US 2023/0336979 A1    Oct. 19, 2023

(51) Int. Cl.
*H04L 9/08* (2006.01)
*H04L 5/00* (2006.01)
*H04L 27/34* (2006.01)
*H04W 12/037* (2021.01)

(52) U.S. Cl.
CPC ......... *H04W 12/037* (2021.01); *H04L 5/0048* (2013.01); *H04L 9/0858* (2013.01); *H04L 27/34* (2013.01)

(58) Field of Classification Search
CPC ............ H04W 12/037; H04W 12/033; H04W 12/041; H04L 5/0048; H04L 9/0858; H04L 27/34; H04L 2209/80; H04L 9/0625; H04L 9/0656; H04L 9/0852; H04L 9/14; H04L 9/16; H04K 1/003; H04K 1/04

See application file for complete search history.

(56) References Cited

U.S. PATENT DOCUMENTS

| 11,399,286 B2* | 7/2022 | Bhushan | H04W 12/041 |
| 2020/0145817 A1* | 5/2020 | Liu | H04W 12/037 |
| 2021/0058792 A1 | 2/2021 | Bhushan et al. | |
| 2023/0056352 A1* | 2/2023 | Elshafie | H04W 12/0431 |

FOREIGN PATENT DOCUMENTS

CN    105846947 B    11/2018

OTHER PUBLICATIONS

International Search Report and Written Opinion—PCT/US2023/017735—ISA/EPO—Jul. 14, 2023.
Li H., et al., "Secure Transmission in OFDM Systems by Using Time Domain Scrambling", 2006 IEEE 63rd Vehicular Technology Conference, IEEE, Jun. 2, 2013, 5 pages, XP032547625, paragraph [0001]—paragraph [00IV].
Zhang, J., et al., "Securing Wireless Communications of the Internet of Things from the Physical Layer, An Overview", Entropy, vol. 19, No. 8, Aug. 18, 2017, p. 420, XP055661156, 16 Pages, Sections 1, 2, 3, 4, paragraph [0003]—paragraph [0005] figure 4.

* cited by examiner

*Primary Examiner* — Baotran N To
(74) *Attorney, Agent, or Firm* — Guang Y. Zhang; Harrity & Harrity, LLP

(57) ABSTRACT

Various aspects of the present disclosure generally relate to wireless communication. In some aspects, a transmitter device may modify, based at least in part on a secrecy key, an input or an output of at least one of binary scrambling, modulation, or orthogonal frequency division multiplexing (OFDM) tone mapping for a physical control channel signal, resulting in a secured physical control channel signal. The transmitter device may transmit, to a receiver device, the secured physical control channel signal. Numerous other aspects are described.

30 Claims, 9 Drawing Sheets

SIGNAL MODIFICATION FOR CONTROL CHANNEL PHYSICAL LAYER SECURITY

FIELD OF THE DISCLOSURE

Aspects of the present disclosure generally relate to wireless communication and to techniques and apparatuses for signal modification for control channel physical layer security.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a transmitter device for wireless communication. The transmitter device may include a memory and one or more processors coupled to the memory. The one or more processors may be configured to modify, based at least in part on a secrecy key, an input or an output of at least one of binary scrambling, modulation, or orthogonal frequency division multiplexing (OFDM) tone mapping for a physical control channel signal, resulting in a secured physical control channel signal. The one or more processors may be configured to transmit, to a receiver device, the secured physical control channel signal.

Some aspects described herein relate to a receiver device for wireless communication. The receiver device may include a memory and one or more processors coupled to the memory. The one or more processors may be configured to receive, from a transmitting device, a secured physical control channel signal. The one or more processors may be configured to retrieve information from the secured physical control channel signal by modifying, based at least in part on a secrecy key, an input or an output of at least one of OFDM tone mapping, demodulation, or binary unscrambling.

Some aspects described herein relate to a method of wireless communication performed by a transmitter device. The method may include modifying, based at least in part on a secrecy key, an input or an output of at least one of binary scrambling, modulation, or OFDM tone mapping for a physical control channel signal, resulting in a secured physical control channel signal. The method may include transmitting, to a receiver device, the secured physical control channel signal.

Some aspects described herein relate to a method of wireless communication performed by a receiver device. The method may include receiving, from a transmitting device, a secured physical control channel signal. The method may include retrieving information from the secured physical control channel signal by modifying, based at least in part on a secrecy key, an input or an output of at least one of OFDM tone mapping, demodulation, or binary unscrambling.

Some aspects described herein relate to a non-transitory computer-readable medium that stores a set of instructions for wireless communication by a transmitter device. The set of instructions, when executed by one or more processors of the transmitter device, may cause the transmitter device to modify, based at least in part on a secrecy key, an input or an output of at least one of binary scrambling, modulation, or OFDM tone mapping for a physical control channel signal, resulting in a secured physical control channel signal. The set of instructions, when executed by one or more processors of the transmitter device, may cause the transmitter device to transmit, to a receiver device, the secured physical control channel signal.

Some aspects described herein relate to a non-transitory computer-readable medium that stores a set of instructions for wireless communication by a receiver device. The set of instructions, when executed by one or more processors of the receiver device, may cause the receiver device to receive, from a transmitting device, a secured physical control channel signal. The set of instructions, when executed by one or more processors of the receiver device, may cause the receiver device to retrieve information from the secured physical control channel signal by modifying, based at least in part on a secrecy key, an input or an output of at least one of OFDM tone mapping, demodulation, or binary unscrambling.

Some aspects described herein relate to an apparatus for wireless communication. The apparatus may include means for modifying, based at least in part on a secrecy key, an input or an output of at least one of binary scrambling, modulation, or OFDM tone mapping for a physical control channel signal, resulting in a secured physical control channel signal. The apparatus may include means for transmitting, to a receiver device, the secured physical control channel signal.

Some aspects described herein relate to an apparatus for wireless communication. The apparatus may include means for receiving, from a transmitting device, a secured physical control channel signal. The apparatus may include means for retrieving information from the secured physical control channel signal by modifying, based at least in part on a secrecy key, an input or an output of at least one of OFDM tone mapping, demodulation, or binary unscrambling.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
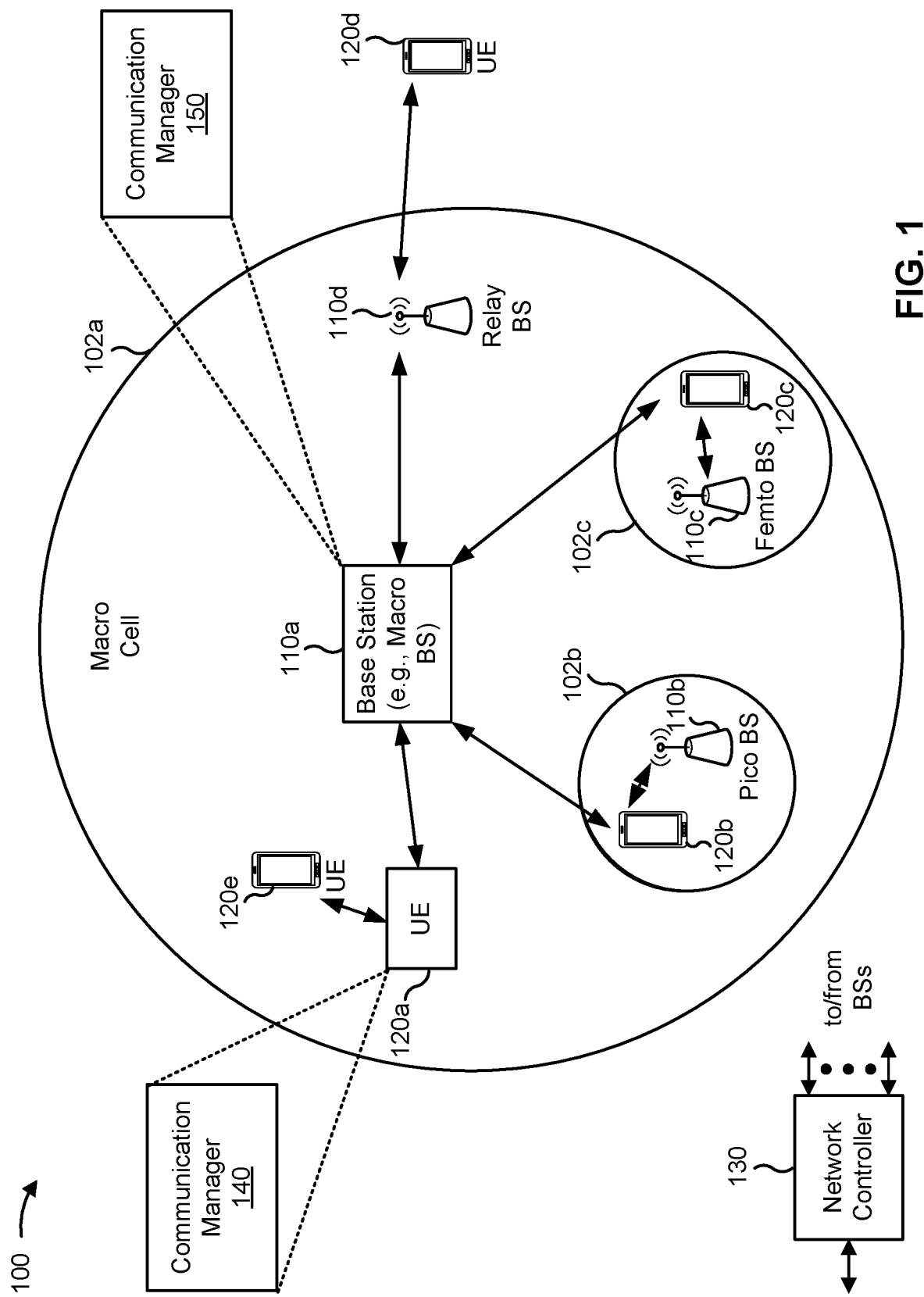
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may modify, based at least in part on a secrecy key, an input or an output of at least one of binary scrambling, modulation, or orthogonal frequency division multiplexing (OFDM) tone mapping for a physical control channel signal, resulting in a secured physical control channel signal; and transmit, to a receiver device, the secured physical control channel signal. Additionally, or alternatively, the communication manager 140 may perform one or more other operations described herein.

In some aspects, a described in more detail elsewhere herein, the communication manager 140 may receive, from a transmitting device, a secured physical control channel signal; and retrieve information from the secured physical control channel signal by modifying, based at least in part on a secrecy key, an input or an output of at least one of OFDM tone mapping, demodulation, or binary unscrambling. Additionally, or alternatively, the communication manager 140 may perform one or more other operations described herein.

In some aspects, the base station 110 may include a communication manager 150. As described in more detail elsewhere herein, the communication manager 150 may modify, based at least in part on a secrecy key, an input or an output of at least one of binary scrambling, modulation, or OFDM tone mapping for a physical control channel signal, resulting in a secured physical control channel signal; and transmit, to a receiver device, the secured physical control channel signal. Additionally, or alternatively, the communication manager 150 may perform one or more other operations described herein In some aspects, as described in more detail elsewhere herein, the communication manager 150 may receive, from a transmitting device, a secured physical control channel signal; and retrieve information from the secured physical control channel signal by modifying, based at least in part on a secrecy key, an input or an output of at least one of OFDM tone mapping, demodulation, or binary unscrambling. Additionally, or alternatively, the communication manager 150 may perform one or more other operations described herein.

As indicated above, FIG. 1 is provided as an example. Other examples may differ from what is described with regard to FIG. 1.

Figure 2:
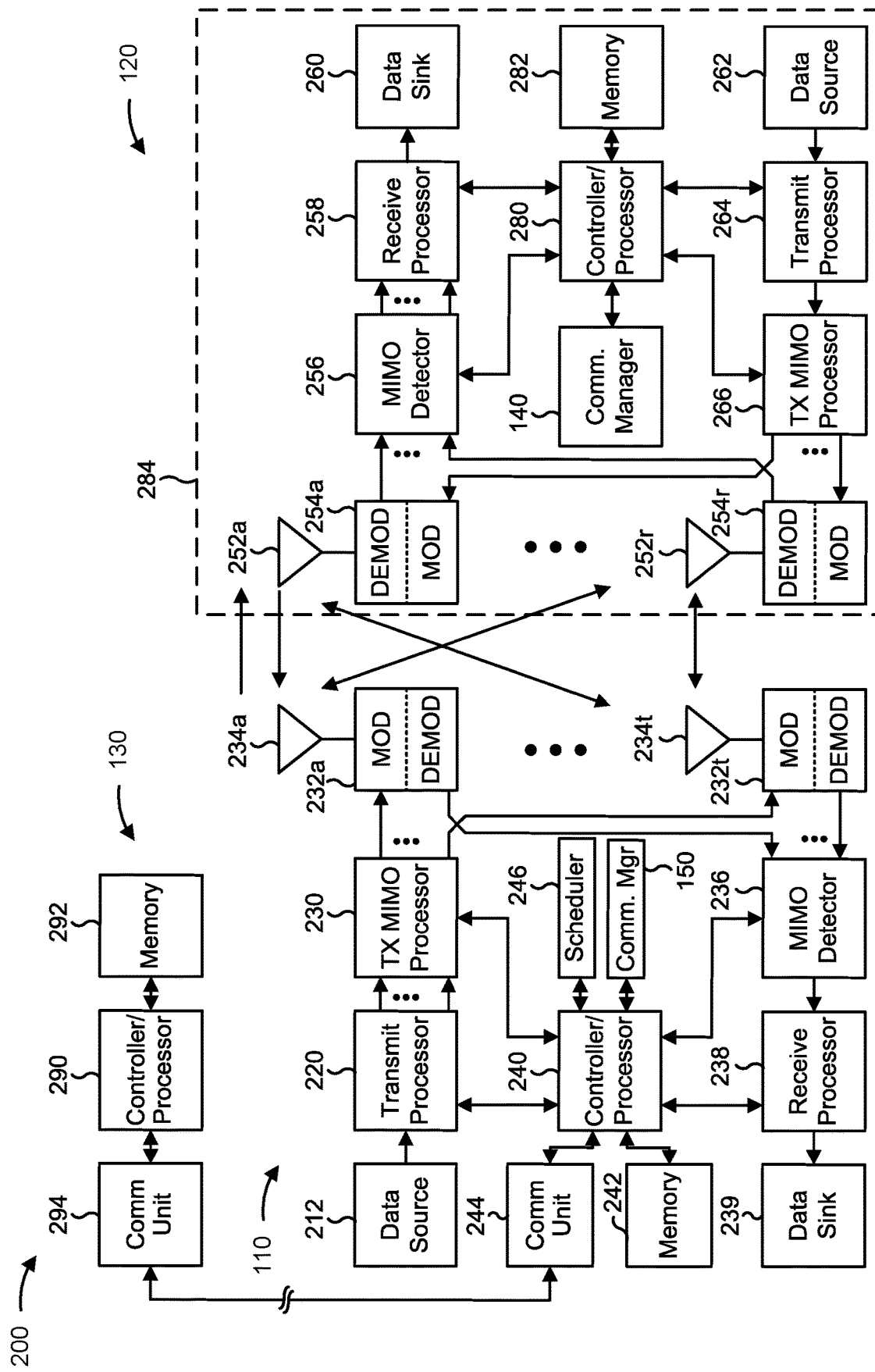
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with signal modification for control channel physical layer security, as described in more detail elsewhere herein. In some aspects, the transmitter device described herein is the UE 120, is included in the UE 120, or includes one or more components of the UE 120 shown in FIG. 2. In some aspects, the transmitter device described herein is the base station 110, is included in the base station 110, or includes one or more components of the base station 110 shown in FIG. 2. In some aspects, the receiver device described herein is the UE 120, is included in the UE 120, or includes one or more components of the UE 120 shown in FIG. 2. In some aspects, the receiver device described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the transmitter device includes means for modifying, based at least in part on a secrecy key, an input or an output of at least one of binary scrambling, modulation, or OFDM tone mapping for a physical control channel signal, resulting in a secured physical control channel signal; and/or means for transmitting, to a receiver device, the secured physical control channel signal. In some aspects, the means for the transmitter device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the transmitter device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the receiver device includes means for receiving, from a transmitting device, a secured physical control channel signal; and/or means for retrieving information from the secured physical control channel signal by modifying, based at least in part on a secrecy key, an input or an output of at least one of OFDM tone mapping, demodulation, or binary unscrambling. In some aspects, the means for the receiver device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the receiver device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
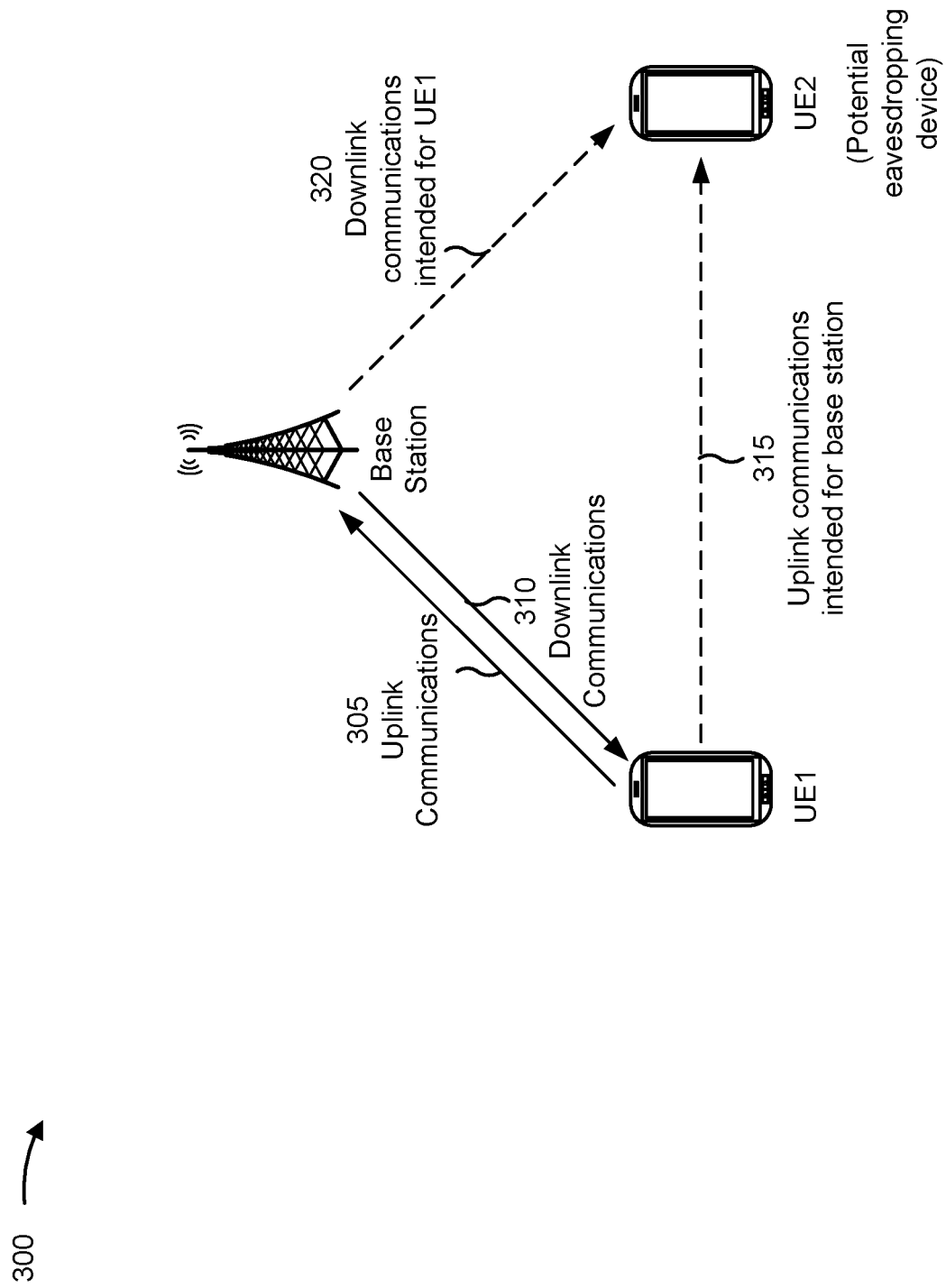
FIG. 3 is a diagram illustrating an example of a wireless network with a potential eavesdropping device, in accordance with the present disclosure

FIG. 3 is a diagram illustrating an example 300 of a wireless network with a potential eavesdropping device, in accordance with the present disclosure.

Secure communications may be important in wireless communications systems. For example, security may be especially beneficial in wireless communication systems, such as IoT systems, in which a large number of devices communicate with each other. In some cases, such as when a UE is in a radio resource control (RRC) connected mode, layer 3 (L3) security may be applied for some communications (e.g., RRC messages) between a base station and a UE. However, some channels, such as layer 1 (L1) (e.g., the physical layer or PHY layer) channels may not have L3 security. For example, such physical layer channels may include a physical downlink control channel (PDCCH), a physical downlink shared channel (PDSCH), a physical uplink control channel (PUCCH), a physical uplink shared channel (PUSCH), a physical sidelink control channel (PSCCH), a physical sidelink shared channel (PSSCH), and/or a physical sidelink feedback channel (PSFCH). In some examples, such physical layer channels may be susceptible to eavesdropping.

As shown in FIG. 3, example 300 includes a base station, a first UE (UE1), and second UE (UE2). As shown by reference number 305, UE1 may transmit uplink communications to the base station. For example, UE1 may transmit PUCCH communications and/or PUSCH communications to the base station. As shown by reference number 310, the base station may transmit downlink communications to UE1. For example, the base station may transmit PDCCH communications and/or PDSCH communications to UE1. UE2 may be a potential eavesdropping device. For example, UE2 may attempt to eavesdrop on communications between UE1 and the base station. As shown by reference number 315, UE2 may attempt to eavesdrop on the uplink communications that are transmitted by UE1 and intended for the base station. In this case, UE2 may receive the uplink communications intended for the base station and attempt to decode the uplink communications. As shown by reference number 320, UE2 may attempt to eavesdrop on the downlink communications that are intended for UE1. In this case, UE2 may receive the downlink communications intended for UE1 and attempt to decode the downlink communications intended for UE1.

In some examples, a potential eavesdropping device, such as UE2, may use a fake base station attack, in which the potential eavesdropping device attempts to appear as the base station to another UE (e.g., UE1) to receive the uplink communications transmitted by that UE. Such eavesdropping can result in leakage of sensitive information, such as personal information, financial information, confidential information, and/or medical information, among other examples, as well as loss of network service and/or reduced network throughput. As shown in FIG. 3, a potential eavesdropping device for communications between a UE (e.g., UE1) and a base station may be another UE (e.g., UE2). In some examples, a potential eavesdropping device for communications between a UE (e.g., UE1) and a base station may be another base station.

As indicated above, FIG. 3 is provided as an example. Other examples may differ from what is described with respect to FIG. 3.

In some cases, upper layer (e.g., L3) security may be the only available source of security from potential eavesdropping devices. However, while upper layer security may be efficient, upper layer security may also be breakable and key changes may be slow for security keys used for upper layer security. Furthermore, physical control channel signals (e.g., PDCCH, PUCCH, and/or physical broadcast channel (PBCH)) may not be secured by upper layer security. As a result, downlink control information (DCI), uplink control information (UCI), and/or a synchronization signal block (SSB) carried on physical control channels may be vulnerable to potential eavesdropping devices.

Some techniques and apparatuses described herein enable a transmitter device to modify, based at least in part on a secrecy key, an input or an output of at least one of binary scrambling, modulation, or OFDM tone mapping for a physical control channel signal, resulting in a secured physical control channel signal. The transmitter device may transmit the secured physical channel control signal to a receiver device. In some aspects, the receiver device may receive the secured physical channel control signal, and the receiver device may retrieve information from the secured physical control channel signal by modifying an input or output of at least one of OFDM tone mapping, demodulation, or binary unscrambling based at least in part on the secrecy key. As a result, information carried on physical control channel signals may be secured. For example, polar codes used to transmit control information on physical control channels may be secured. This may protect transmissions of control information on physical control channels from potential eavesdropping devices, as well as boost the overall security of wireless communications between wireless communication devices (e.g., UEs and base stations).

Figure 4:
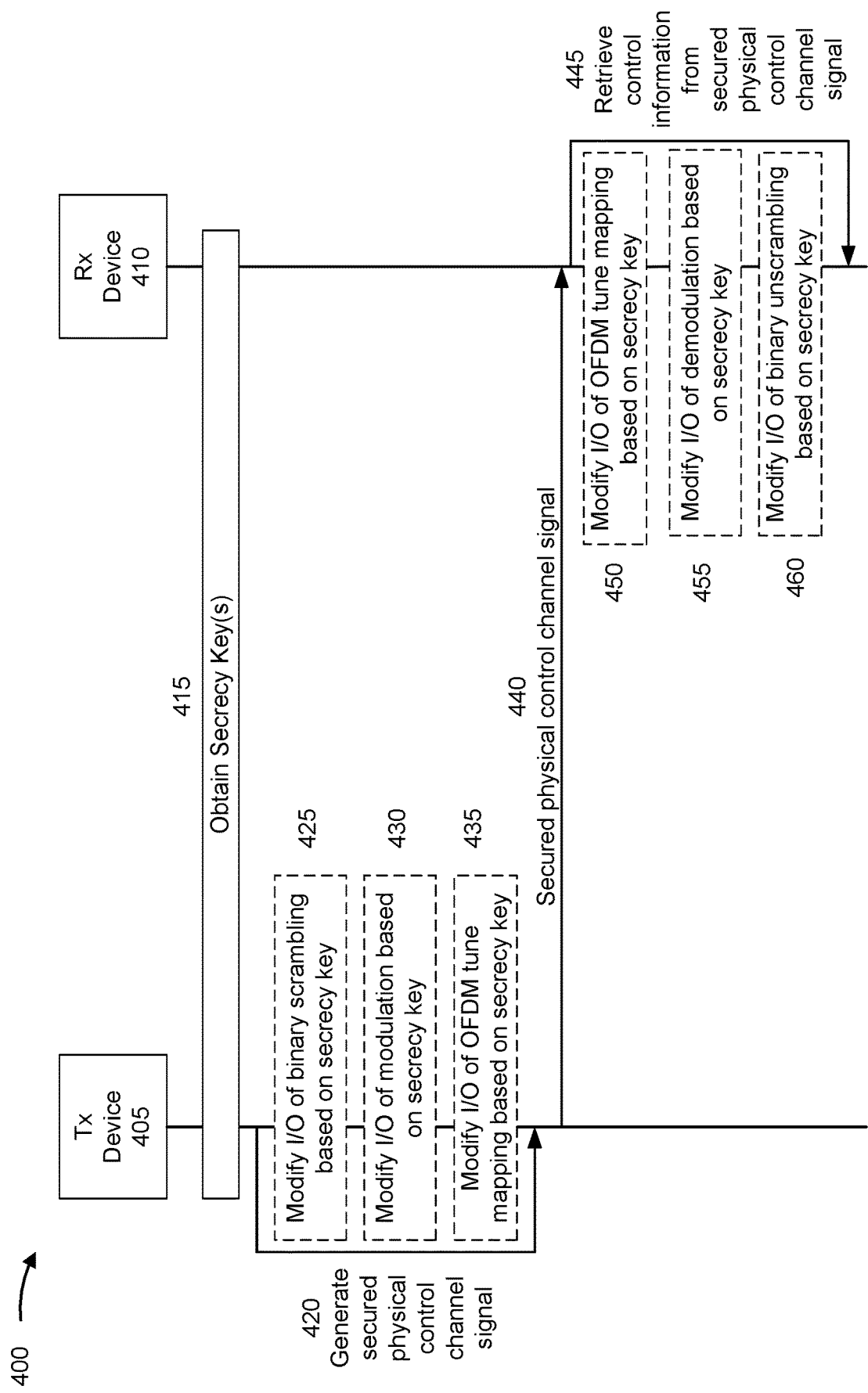
FIGS. 4-5 are diagrams illustrating examples associated with signal modification for control channel physical layer security, in accordance with the present disclosure.

FIG. 4 is a diagram illustrating an example 400 associated with signal modification for control channel physical layer security, in accordance with the present disclosure. As shown in FIG. 4, example 400 includes communication between a transmitter device (Tx device) 405 and a receiving device (Rx device) 410. In some aspects, the Tx device 405 and the Rx device 410 may be included in a wireless network, such as wireless network 100. Tx device 405 and the Rx device 410 may communicate via a wireless access link, which may include an uplink, a downlink, and/or a sidelink. In some aspects, the Tx device 405 may be a base station (e.g., base station 110) and the Rx device 410 may be a UE (e.g., UE 120). In some aspects, the Tx device 405 may be a UE (e.g., UE 120) and the Rx device 410 may be a base station (e.g., base station 110). In some aspects, the Tx device 405 may be first UE (e.g., UE 120) and the Rx device 410 may be a second UE (e.g., UE 120).

As shown in FIG. 4, and by reference number 415, the Tx device 405 and the Rx device 410 may obtain one or more secrecy keys. A secrecy key (or cryptography key) is a sequence of bits that can be used to encrypt or mask information sent from a sender (e.g., the Tx device 405) and to decrypt or unmask the information received by a receiver (e.g., the Rx device 410). In some aspects, the Tx device 405 and the Rx device 410 may obtain a symmetric key using an L3 key generation technique, such as Diffie-Hellman technique. Such L3 key generation techniques may rely on RSA or elliptic curve cryptography (ECC), among other examples, to generate the secrecy key. For example, in some aspects, the Rx device 410 may generate a public key (n, e) and a private key (d), wherein n is a modulus for both the public and private keys, e is a public encryption exponent, and d is a private decryption exponent. The Rx device 410 may send the private key to other devices, including the Tx device 405. The Tx device may encrypt the secrecy key (m) using the public key (n, e) and transmit the encrypted secrecy key ($m^e$ mod n) to the Rx device 410. The Rx device 410 may decrypt the encrypted secrecy key using the private key (d) by computing $(m^e)^d = m$ (mod n) in order to determine the secrecy key m, which results in both the Tx device 405 and the Rx device 410 knowing the secrecy key m.

In some aspects, the Tx device 405 and the Rx device 410 may obtain the secrecy key from the physical layer based at least in part on channel reciprocity and randomness. In some aspects, the Tx device 405 and the Rx device 410 may obtain or generate multiple secrecy keys to be used for securing a physical control channel signal. For example, in some aspects, the Tx device 405 and the Rx device 410 may obtain or generate a first secrecy key for modifying inputs and/or outputs of binary scrambling for a physical control channel signal, a second secrecy key for modifying inputs and/or outputs of modulation (e.g., quadrature amplitude modulation (QAM) or quadrature phase shift keying (QPSK) modulation) for the physical control channel signal, and/or a third secrecy key for modifying inputs and/or outputs of OFDM tone mapping for the physical control channel signal.

As further shown in FIG. 4, and by reference number 420, the Tx device 405 may generate a secured physical control channel signal based at least in part on the one or more secrecy keys. In some aspects, in a case in which the Tx device 405 is a base station and the Rx device 410 is a UE, the physical control channel signal may be a PDCCH signal including DCI or a PDCCH signal including an SSB. In some aspects, in a case in which the Tx device 405 is a UE and the Rx device 410 is a base station, the physical control channel signal may be a PUCCH signal including UCI. The Tx device 405 may attach a cyclic redundancy check (CRC) (e.g., a 24-bit CRC) to a payload of control information (e.g., DCI or UCI) for a physical control channel signal. The Tx device 405 may interleave the CRC with information bits in the payload, code the bits in the payload (including the CRC) into coded bits (e.g., using polar coding), and perform rate matching to match the number of coded bits to the resources available for the physical control channel transmission. The Tx device 405 may then perform binary scrambling to scramble the coded bits and perform QPSK (or QAM) modulation to modulate the scrambled bits to QPSK (or QAM) symbols. The Tx device 405 may then perform OFDM tone mapping to map the QPSK (or QAM) symbols to OFDM tones, which may be modulated onto resource elements to be used for transmitting the physical control channel signal.

In some aspects, the Tx device 405, in order to generate the secured physical control channel signal, may secure a physical control channel signal by modifying inputs or outputs of the binary scrambling for the physical control channel, the modulation (e.g., QAM or QPSK modulation) for the physical control channel, or the OFDM tone mapping signal for the physical control channel, or any combination thereof, based at least in part on the one or more secrecy keys.

As shown in FIG. 4, and by reference number 425, the Tx device 405 may modify inputs and/or outputs of the binary scrambling for the physical control channel communication based at least in part on a secrecy key. In some aspects, the Tx device 405 may modify the inputs and/or the outputs of the binary scrambling based at least in part on a first secrecy key.

In some aspects, the binary scrambling may scramble a block of bits $b(0), \ldots, b(M_{bit}-1)$, where $M_{bit}$ is the number of bits transmitted on the physical channel, resulting in a block of scrambled bits $\tilde{b}(0), \ldots, \tilde{b}(M_{bit}-1)$ according to $\tilde{b}(i)=(b(i)+c(i))$ mod 2, where $c(i)$ is determined from a scrambling sequence $c(n)$ generated by a scrambling sequence generator. For example, the scrambling sequence generator may generate the scrambling sequence $c(n)$ of length $M_{bit}$, where $n=0, 1, \ldots, M_{bit}$, according to:

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where $N_c=1600$, $x_1(n)$ is a first m-sequence, and $x_2(n)$ is second first m-sequence. In some aspects, in order to mask or encrypt the scrambled bits, the Tx device 405 may use the secrecy key to initialize the scrambling sequence generator. For example, in some aspects, the Tx device 405 may use a first portion of the secrecy key (e.g., a first portion of the bits in the secrecy key) to initialize the first m-sequence ($x_1(n)$) of the scrambling sequence generator and a second portion of the secrecy key (e.g., a second portion of the bits in the secrecy key) to initialize the second m-sequence ($x_2(n)$) of the scrambling sequence generator.

In some aspects, the Tx device 405 may mask the scrambled bits resulting from the binary scrambling by encrypting (or encoding) the scrambled bits using the secrecy key. In some aspects, the Tx device may encrypt (or encode) the scrambled bits using a bitwise exclusive OR (XOR) operation with the secrecy key, a block cipher with the secrecy key as an encryption key input, or advanced encryption standard (AES) encryption with the secrecy key as the encryption key input. For example, the Tx device 405 may perform a bitwise XOR operation between the scrambled bits resulting from the binary scrambling and the bits of the secrecy key. In some aspects, the Tx device 405 may perform a bitwise XOR operation between the scrambled bits resulting from the binary scrambling and respective bits of a sequence generated using the secrecy key. For example, the sequence may be the same length as the block of scrambled bits, and the sequence may be generated by initializing the scrambling sequence generator using the secrecy key.

In some aspects, the Tx device 405 device may use a first portion of the secrecy key to initialize the scrambling sequence generator, perform the binary scrambling based at least in part on the scrambling sequence generator, and mask the resulting scrambled bits by encrypting the scrambling bits using a second portion of the secrecy key (e.g., using a bitwise XOR operation, a block cipher, or AES encryption). In this case, the Tx device 405 may initialize the first m-sequence of the scrambling sequence generator using a first sub-portion of the first portion of the secrecy key, and the Tx device 405 may initialize the second m-sequence of the scrambling sequence generator using a second sub-portion of the first portion of the secrecy key.

As further shown in FIG. 4, and by reference number 430, the Tx device 405 may modify inputs and/or outputs of the modulation (e.g., QAM or QPSK modulation) based at least in part on a secrecy key. In some aspects, the Tx device 405 may modify the inputs and/or the outputs of the modulation (e.g., QAM or QPSK modulation) based at least in part on a second secrecy key that is different from the first secrecy key used for the binary scrambling.

In some aspects, the Tx device 405 may mask the scrambled bits input to the QPSK (or QAM) modulation by encrypting the scrambled bits input to the QPSK (or QAM) modulation using the secrecy key (e.g., using a bitwise XOR operation with the secrecy key, a block cipher with the secrecy key as the encryption key input, or AES encryption with the secrecy key as the encryption key input). For example, the Tx device 405 may perform a bitwise XOR operation between the scrambled bits and the bits of the secrecy key. In some aspects, the Tx device 405 may perform a bitwise XOR operation between the scrambled bits resulting from the binary scrambling and respective bits of a sequence generated using the secrecy key.

In some aspects, the QPSK (or QAM) modulation may represent bits as QPSK (or QAM) constellation points that are associated with QPSK (or QAM) symbols. In this case, the QPSK (or QAM) constellation points may have respective real and imaginary parts. In some aspects, the Tx device 405 may swap real an imaginary parts associated with one or more of the QPSK (or QAM) constellation points based at least in part on the secrecy key. For example, the Tx device 405 may determine to switch the real and imaginary parts for a subset of the QPSK (or QAM) constellation points according to bit values (e.g., 0 or 1) of the secrecy key or bit values (e.g., 0 or 1) of a sequence generated using the secrecy key.

In some aspects, the Tx device 405 may modify the QPSK (or QAM) symbols resulting from the QPSK (or QAM) modulation by applying a phase shift generated based at least in part on the secrecy key. In this case, the Tx device 405 may determine a respective phase shift to apply to each QPSK (or QAM) symbol using the secrecy key. In some aspects, the Tx device 405 may modify the QPSK (or QAM) symbols resulting from the QPSK (or QAM) modulation by rotating the QPSK (or QAM) symbols based at least in part on the secrecy key. In this case, the Tx device 405 may determine a respective rotation to apply to each QPSK (or QAM) symbol using the secrecy key.

As further shown in FIG. 4, and by reference number 435, the Tx device 405 may modify inputs and/or outputs of the OFDM tone mapping for the physical control channel signal based at least in part on a secrecy key. In some aspects, the Tx device 405 may modify the inputs and/or the outputs of the OFDM tone mapping based at least in part on a third secrecy key that is different from the first secrecy key using for the binary scrambling and the second secrecy key that is used for the QPSK (or QAM) modulation.

The OFDM tone mapping may map the QPSK (or QAM) symbols resulting from the QPSK (or QAM) modulation to OFDM tones (and resource elements associated with the OFDM tones). In some aspects, the Tx device 405 may re-map the OFDM tones based at least in part on the secrecy key to modify the mapping of the QPSK (or QAM) symbols the OFDM tones prior to performing OFDM modulation to modulate the OFDM tones onto the resource elements. For example, the Tx device 405 may scramble the resource elements to which the QPSK (or QAM) symbols are mapped based at least in part on the secrecy key. In some aspects, the Tx device 405 may use a predefined scrambling function to scramble the resource elements (e.g., re-map the OFDM tones) for the QPSK (or QAM) symbols as a function of the secrecy key. For example, a UE (e.g., the Tx device 405 or the Rx device 410) may be configured with the scrambling function (e.g., via an RRC message or a medium access control (MAC) control element (MAC-CE)), such that the base station (e.g., the Tx device 405 or the Rx device 410) and the UE (e.g., the Tx device 405 or the Rx device 410) both know the scrambling function to be used with the secrecy key. In some aspects, the configuration may include multiple possible scrambling function, and the base station (e.g., the Tx device 405 or the Rx device 410) may transmit, to the UE (e.g., the Tx device 405 or the Rx device 410), an indication of which scrambling function to use with the secrecy key. In some aspects, the configuration may include multiple possible scrambling functions, and the Tx device 405 (and the Rx device 410) may determine which scrambling function to use based at least in part on the secrecy key.

As further shown in FIG. 4, and by reference number 440, the Tx device 405 may transmit the secured physical control channel signal to the Rx device 410. The Rx device 410 may receive the secured physical control channel signal transmitted by the Tx device 405. In some aspects, in a case in which the Tx device 405 is a base station and the Rx device 410 is a UE, the secured physical control channel signal may be a secured PDCCH transmission or a secured PBCH transmission. In some aspects, in a case in which the Tx device 405 is a UE and the Rx device 410 is a base station, the secured physical control channel signal may be a PUCCH transmission.

As further shown in FIG. 4, and by reference number 445, the Rx device 410 may retrieve control information (e.g., DCI or UCI) from a payload of the secured physical control channel signal based at least in part on the one or more secrecy keys. In connection with receiving a physical control channel signal, the Rx device 410 may demodulate the received physical control channel signal into OFDM tones, perform OFDM mapping (e.g., reverse OFDM mapping) to map the OFDM tones to OPSK (or QAM) symbols, perform OPSK (or QAM) demodulation to retrieve a block of scrambled bits, and perform binary unscrambling to unscramble the scrambled bits. The Rx device 410 may then decode the unscrambled block of bits (e.g., polar coded bits) to retrieve the control information included in the payload of the physical control channel communication.

In some aspects, the Rx device 410 may modify inputs and/or outputs of the OFDM tone mapping (e.g., reverse OFDM tone mapping) for the secured physical control channel communication, the OPSK (or QAM) demodulation for the secured physical control channel communication, the binary unscrambling for the secured physical control channel communication, or any combination thereof based at least in part on the one or more secrecy keys.

As further shown in FIG. 4, and by reference number 450, the Rx device 410 may modify inputs and/or outputs of the OFDM tone mapping (e.g., reverse OFDM tone mapping) based at least in part on a secrecy key. In some aspects, the Rx device 410 may modify the inputs and/or outputs of the OFDM tone mapping to reverse (e.g., decrypt) the modifications to the inputs and/or outputs of the OFDM tone mapping performed by the Tx device 405 for the secured physical control channel communication. For example, prior to mapping the OFDM tones to the OPSK (or QAM) symbols, the Rx device 410 may reverse the re-mapping of the OFDM tones to OPSK (or QAM) (e.g., unscramble the scrambled resource elements/OFDM tones) performed by the Tx device 405 using the predefined scrambling function and the secrecy key. In some aspects, the Rx device 410 may modify the inputs and/or outputs of the OFDM tone mapping (e.g., to reverse or unscramble the re-mapping of the OFDM tones performed by the Tx device 405) using the third secrecy key used by the Tx device 405 to perform the re-mapping of the OFDM tones.

As further shown in FIG. 4, and by reference number 455, the Rx device 410 may modify inputs and/or outputs of the demodulation (e.g., the QAM or QPSK demodulation) for the secured physical control channel signal based at least in part on a secrecy key. In some aspects, the Rx device 410 may modify the inputs and/or the outputs for the QPSK (or QAM) demodulation to reverse (e.g., decrypt) the modifications to the inputs and/or the outputs of the QPSK (or QAM) modulation performed by the Tx device 405. In some aspects, the Rx device 410 may modify the inputs and/or the outputs for the QPSK (or QAM) demodulation using the second secrecy key used by the Tx device 405 to modify the inputs and/or outputs of the QPSK (or QAM) modulation for the secured physical control channel signal.

In some aspects, the Rx device 410 may modify the QPSK (or QAM) symbols to be demodulated by a phase shift generated based at least in part on the secrecy key (e.g., to reverse a phase shift applied to the QPSK (or QAM) symbols by the Tx device 405 based at least in part on the secrecy key). In some aspects, the Rx device 410 may rotate the QPSK (or QAM) symbols to be modulated based at least in part on the secrecy key (e.g., to reverse a rotation applied to the QPSK (or QAM) symbols by the Tx device 405 based at least in part on the secrecy key). In some aspects, the Rx device 410 may swap real and imaginary parts associated with one or more QPSK (or QAM) constellation points for QPSK (or QAM) demodulation based at least in part on the secrecy key (e.g., to reverse swapping of the real and imaginary parts associated with the one or more QPSK (or QAM) constellation points by the Tx device 405 based at least in part on the secrecy key). In some aspects, the Rx device 410 may unmask output bits resulting from the QPSK (or QAM) demodulation by decrypting the output bits from the demodulation using the secrecy key. In some aspects, the Rx device 410 may decrypt the output bits from the demodulation using the secrecy key to reverse encryption performed (e.g., using a bitwise XOR operation with the secrecy key, a block cipher with the secrecy key as the encryption key input, or AES encryption with the secrecy key as the encryption key input) by the Tx device 405. For example, the Rx device 410 may reverse a bitwise XOR operation performed between the output bits of the demodulation and bits of the secrecy key (or bits of a sequence generated using the secrecy key).

As further shown in FIG. 4, and by reference number 460, the Rx device 410 may modify inputs and/or outputs of the binary unscrambling for the secured physical control channel signal based at least in part on a secrecy key. In some aspects, the Rx device 410 may modify the inputs and/or outputs of the binary unscrambling to reverse (e.g., decrypt) the modifications to the inputs and/or outputs of the binary scrambling performed for the secured physical control channel signal by the Tx device 405. In some aspects, the Rx device 410 may modify the inputs and/or the outputs for the binary unscrambling using the first secrecy key used by the Tx device 405 to modify the inputs and/or outputs of the binary scrambling for the secured physical control channel signal.

The binary unscrambling may reverse the binary scrambling performed by the Tx device 405 for the secured physical control channel signal. In some aspects, the Rx device 410 may initialize the scrambling sequence generator based at least in part on the secrecy key and unscramble the scrambled bits based at least in part on the scrambling sequence generate by the scrambling sequence generator. For example, the Rx device 410 may initialize the first m-sequence of the scrambling sequence generator using a first portion of the secrecy key, and the Rx device 410 may initialize the second m-sequence generator using a second portion of the secrecy key. In some aspects, the Rx device 410 may unmask the scrambled bits to be unscrambled by decrypting (or decoding) the scrambled bits using the secrecy key. In some aspects, the Rx device 410 may decrypt (or decode) the scrambled bits using the secrecy to reverse the encryption of the scrambled bits performed (e.g., using a bitwise XOR operation with the encryption key, a block cipher with the secrecy key as the encryption key input, or AES encryption with the secrecy key as the encryption key input) by the Tx device 405. For example, the Rx device 410 may reverse a bitwise XOR operation between the scrambled bits and bits of the secrecy key (or bits of a sequence generated using the secrecy key). In some aspects, the Rx device 410 may unmask the scrambled bits to be unscrambled by decrypting the scrambled bits using a portion of the secrecy key. In this case, the Rx device may decrypt the scrambled bits to reverse the encryption of the scrambled bits performed (e.g., using a bitwise XOR operation, a block cipher, or AES encryption) using the portion of the secrecy key. For example, the Rx device 410 may reverse a bitwise XOR operation between the scrambled bits and bits of a portion of the secrecy key (or bits of a sequence generated using the portion of the secrecy key), and the Rx device 410 may unscramble the scrambled bits based at least in part on a scrambling sequence generated by a scrambling sequence generator initialized using another portion of the secrecy key.

As described above, the Tx device 405 may modify, based at least in part on a secrecy key, an input or an output of at least one of binary scrambling, modulation, or OFDM tone mapping for a physical control channel signal, resulting in a secured physical control channel signal. The Tx device 405 may transmit the secured physical channel control signal to the Rx device 410. In some aspects, the Rx device 410 may receive the secured physical channel control signal, and the Rx device 410 may retrieve information from the secured physical control channel signal by modifying an input or output of at least one of OFDM tone mapping, demodulation, or binary unscrambling based at least in part on the secrecy key. As a result, information carried on the physical control channel signal may be secured. For example, polar codes used to transmit control information (e.g., DCI or UCI) on physical control channels may be secured. This may protect transmissions of control information on physical control channels from potential eavesdropping devices, as well as boost the overall security of wireless communications between wireless communication devices (e.g., UEs and base stations).

As indicated above, FIG. 4 is provided as an example. Other examples may differ from what is described with respect to FIG. 4.

Figure 5:
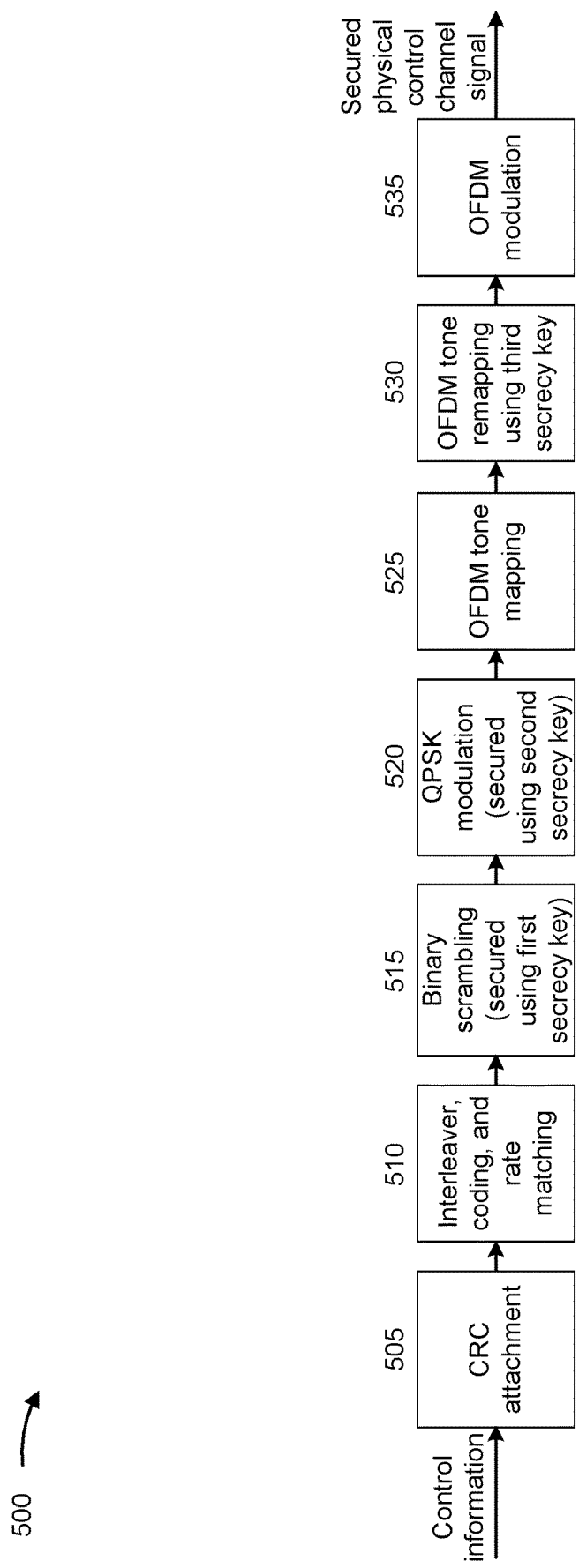

FIG. 5 is a diagram illustrating an example 500 associated with signal modification for control channel physical layer security, in accordance with the present disclosure. As shown in FIG. 5, example 500 shows an example of generating a secured physical control channel communication by a Tx device (e.g., Tx device 405). In some aspects, the Tx device may be a base station (e.g., base station 110). In this case, the secured physical control channel communication may be a PDCCH signal or a PBCH signal transmitted to a UE. In some aspects, the Tx device may be a UE. In this case, the secured physical control channel communication may be a PUCCH signal transmitted to a base station.

As shown in FIG. 5, and by reference number 505, the Tx device may attach a CRC (e.g., a 24-bit CRC) to a payload of control information (e.g., DCI or UCI) for the physical control channel signal. As shown by reference number 510, the Tx device may interleave the CRC with information bits in the payload, code the bits in the payload (including the CRC) into coded bits (e.g., using polar coding), and perform rate matching to match the number of coded bits to the resources available for the physical control channel transmission.

As further shown in FIG. 5, and by reference number 515, the Tx device may perform binary scrambling to scramble the coded bits. In some aspects, as described above in connection with FIG. 4, the Tx device may secure the scrambled bits scrambled by the binary scrambling using a first secrecy key. In some aspects, the Tx device may initialize a scrambling sequence generator based at least in part on the first secrecy key, and the Tx device may scramble the bits based at least in part on a scrambling sequence generated using the scrambling sequence generator. In some aspects, the Tx device may mask scrambled bits resulting from the binary scrambling by encrypting the scrambled bits using first secrecy key (e.g., using a bitwise XOR operation, a block cipher, or AES encryption). In some aspects, the Tx device may scramble the bits based at least in part on a scrambling sequence generated by a scrambling sequence generator initialized using a first portion of the first secrecy key, and the Tx device may mask the scrambled bits resulting from the binary scrambling by encrypting the scrambled bits using a second portion of the first secrecy key (e.g., using a bitwise XOR operation, a block cipher, or AES encryption).

As further shown in FIG. 5, and by reference number 520, the Tx device may perform QPSK modulation to modulate the scrambled bits to QPSK symbols. In some aspects, as described above in connection with FIG. 4, the Tx device may secure the QPSK symbols resulting from the QPSK modulation using a second secrecy key. In some aspects, the Tx device may mask input bits to the QPSK modulation encrypting the input bits to the QPSK modulation using the second secrecy key (e.g., using a bitwise XOR operation, a block cipher, or AES encryption). In some aspects, the Tx device may swap real and imaginary parts associated with one or more QPSK constellation points based at least in part on the second secrecy key. In some aspects, the Tx device may modify the QPSK symbols resulting from the QPSK modulation by a phase shift or rotation generated based at least in part on the second secrecy key.

As further shown in FIG. 5, and by reference number 525, the Tx device may perform OFDM tone mapping to map the QPSK symbols to OFDM tones. As further shown by reference number 530, the Tx device may perform OFDM tone remapping using a third secrecy key. For example, the Tx device may scramble the OFDM tones (e.g., the resource elements) mapped to the QPSK symbols based at least in part on the secrecy key. In some aspects, the Tx device may use a predefined/configured scrambling function to scramble the resource elements (e.g., re-map the OFDM tones) for the QPSK symbols as a function of the secrecy key.

As further shown in FIG. 5, and by reference number 535, the OFDM tones may be modulated onto the resource elements used to transmit the physical control channel signal to an Rx device (e.g., Rx device 410). In some aspects, the Rx device may be a UE receiving a secured PDCCH signal including DCI. In some aspects, the Rx device may be a base station receiving a secured PUCCH signal including UCI. As described above in connection with FIG. 4, the Rx device may use the first, second, and third secrecy keys to reverse (e.g., decrypt) the modifications (e.g., encryption) performed on the secured physical control channel signal in order to retrieve the control information (e.g., DCI or UCI) in the payload of the secured physical control channel signal.

As indicated above, FIG. 5 is provided as an example. Other examples may differ from what is described with respect to FIG. 5.

Figure 6:
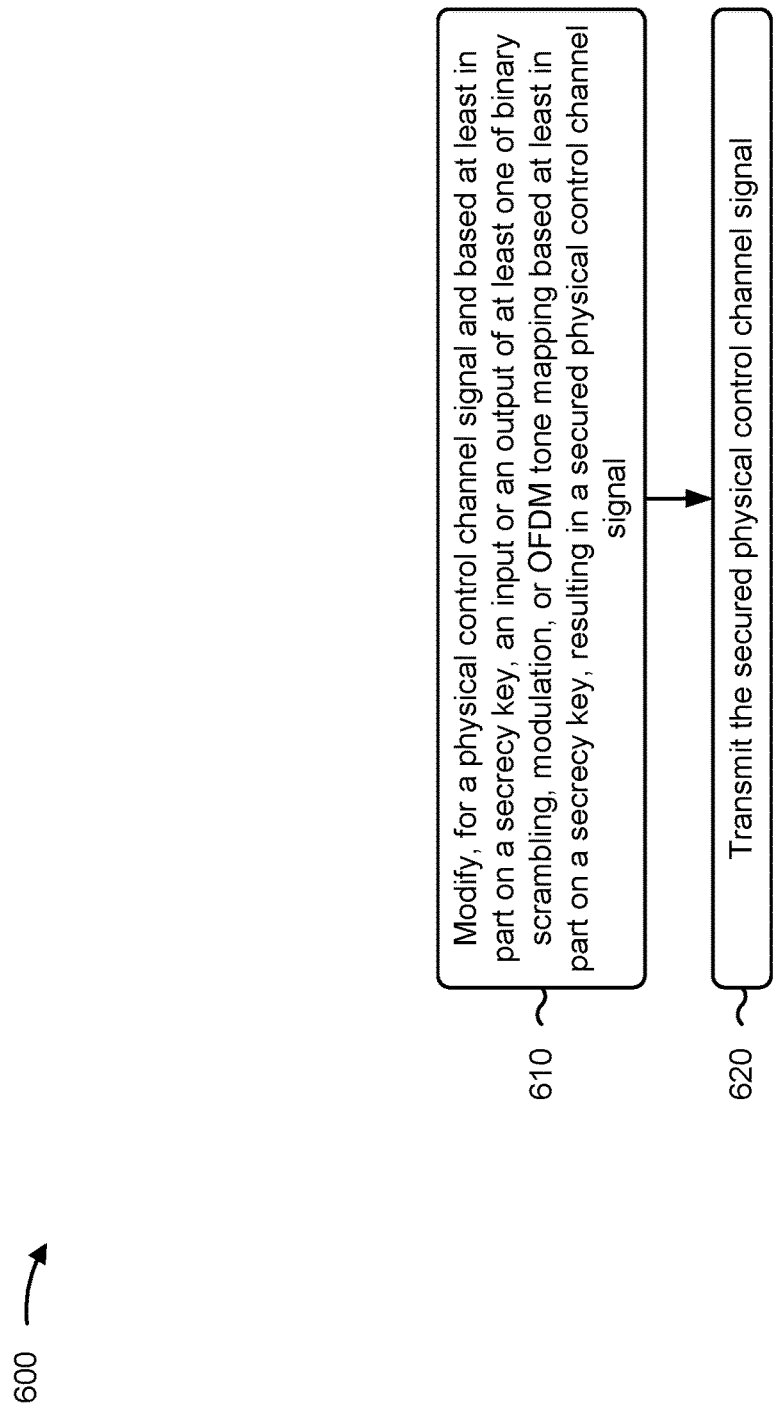
FIGS. 6-7 are diagrams illustrating example processes associated with signal modification for control channel physical layer security, in accordance with the present disclosure.

FIG. 6 is a diagram illustrating an example process 600 performed, for example, by a transmitter device, in accordance with the present disclosure. Example process 600 is an example where the transmitter device (e.g., transmitter device 405) performs operations associated with signal modification for control channel physical layer security.

As shown in FIG. 6, in some aspects, process 600 may include modifying, based at least in part on a secrecy key, an input or an output of at least one of binary scrambling, modulation, or OFDM tone mapping for a physical control channel signal, resulting in a secured physical control channel signal (block 610). For example, the transmitter device (e.g., using communication manager 140 and/or modification component 808, depicted in FIG. 8; or using communication manager 150 and/or modification component 908, depicted in FIG. 9) may modify, based at least in part on a secrecy key, an input or an output of at least one of binary scrambling, modulation, or OFDM tone mapping for a physical control channel signal, resulting in a secured physical control channel signal, as described above.

As further shown in FIG. 6, in some aspects, process 600 may include transmitting, to a receiver device, the secured physical control channel signal (block 620). For example, the transmitter device (e.g., using communication manager 140 and/or transmission component 804, depicted in FIG. 8; or communication manager 150 and/or transmission component 904, depicted in FIG. 9) may transmit, to a receiver device, the secured physical control channel signal, as described above.

Process 600 may include additional aspects, such as any single aspect or any combination of aspects described below and/or in connection with one or more other processes described elsewhere herein.

In a first aspect, modifying the input or the output of the at least one of the binary scrambling, the modulation, or the OFDM tone mapping includes initializing a scrambling sequence generator based at least in part on the secrecy key, and the scrambling sequence generator generates a scrambling sequence for the binary scrambling.

In a second aspect, alone or in combination with the first aspect, initializing a scrambling sequence generator based at least in part on the secrecy key includes initializing a first m-sequence of the scrambling sequence using a first portion of the secrecy key, and initializing a second m-sequence of the scrambling sequence using a second portion of the secrecy key.

In a third aspect, alone or in combination with one or more of the first and second aspects, modifying the input or the output of the at least one of the binary scrambling, the modulation, or the OFDM tone mapping includes masking scrambled bits resulting from the binary scrambling by encrypting the scrambled bits using the secrecy key.

In a fourth aspect, alone or in combination with one or more of the first through third aspects, modifying the input or the output of the at least one of the binary scrambling, the modulation, or the OFDM tone mapping includes initializing a scrambling sequence generator based at least in part on a first portion of the secrecy key, wherein the scrambling sequence generator generates a scrambling sequence for the binary scrambling, and masking scrambled bits resulting from the binary scrambling by encrypting the scrambled bits using a second portion of the secrecy key.

In a fifth aspect, alone or in combination with one or more of the first through fourth aspects, modifying the input or the output of the at least one of the binary scrambling, the modulation, or the OFDM tone mapping includes masking input bits to the modulation by encrypting the input bits to the modulation using the secrecy key.

In a sixth aspect, alone or in combination with one or more of the first through fifth aspects, modifying the input or the output of the at least one of the binary scrambling, the modulation, or the OFDM tone mapping includes swapping real and imaginary parts associated with constellation points for QAM or QPSK modulation based at least in part on the secrecy key.

In a seventh aspect, alone or in combination with one or more of the first through sixth aspects, modifying the input or the output of the at least one of the binary scrambling, the modulation, or the OFDM tone mapping includes modifying QAM or QPSK symbols resulting from QAM or QPSK modulation by a phase shift generated based at least in part on the secrecy key.

In an eighth aspect, alone or in combination with one or more of the first through seventh aspects, modifying the input or the output of the at least one of the binary scrambling, the modulation, or the OFDM tone mapping includes rotating QAM or QPSK symbols resulting from QAM or QPSK modulation based at least in part on the secrecy key.

In a ninth aspect, alone or in combination with one or more of the first through eighth aspects, modifying the input or the output of the at least one of the binary scrambling, the modulation, or the OFDM tone mapping includes re-mapping OFDM tones resulting from the OFDM tone mapping based at least in part on the secrecy key.

In a tenth aspect, alone or in combination with one or more of the first through ninth aspects, modifying the input or the output of the at least one of the binary scrambling, the modulation, or the OFDM tone mapping includes modifying an input or output of the binary scrambling based at least in part on a first secrecy key, modifying an input or output of the modulation based at least in part on a second secrecy key, and modifying an input or output of the OFDM tone mapping based at least in part on a third secrecy key.

In an eleventh aspect, alone or in combination with one or more of the first through tenth aspects, the transmitter device is a base station, the receiver device is a user equipment, and the physical control channel signal is a physical downlink control channel signal or a physical broadcast control channel signal.

In a twelfth aspect, alone or in combination with one or more of the first through tenth aspects, the transmitter device is a user equipment, the receiver device is a base station, and the physical control channel signal is a physical uplink control channel signal.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
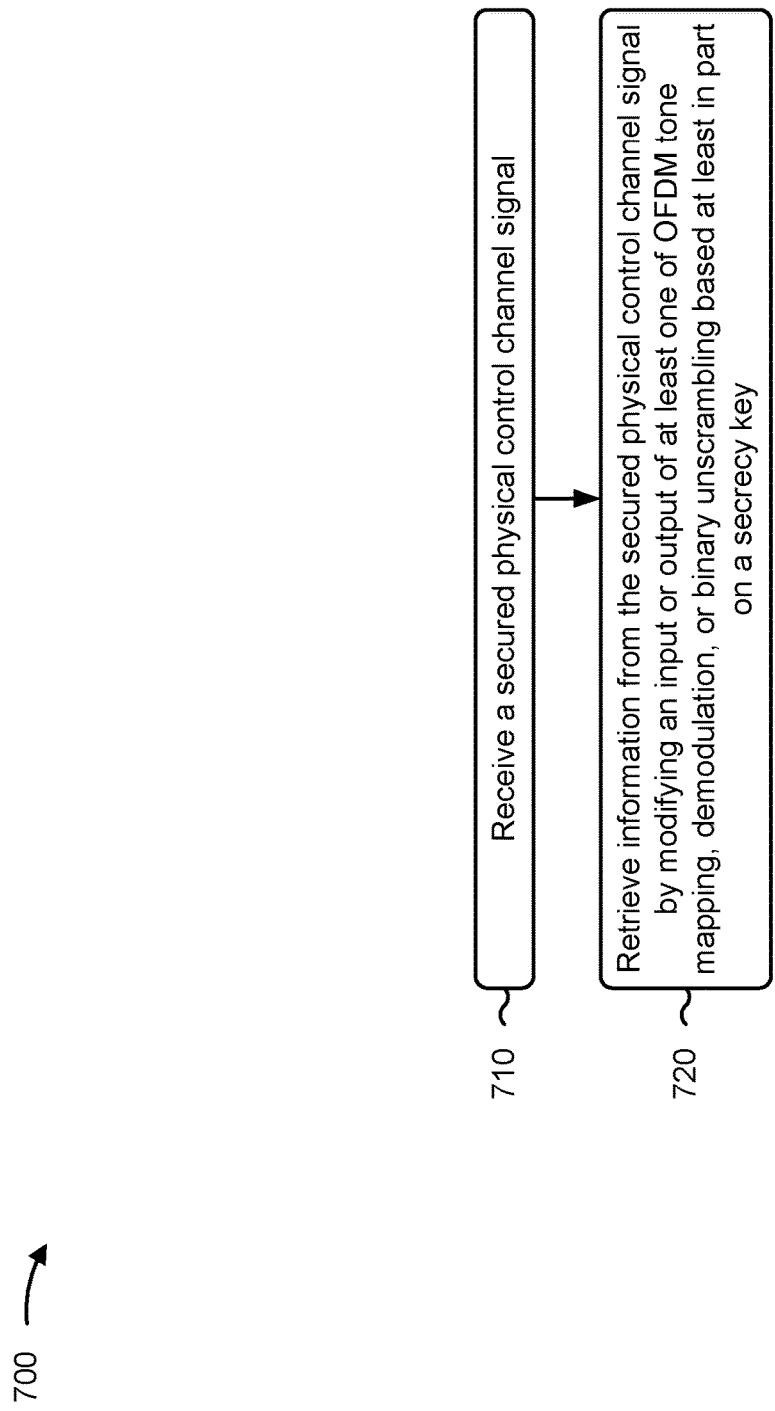

FIG. 7 is a diagram illustrating an example process 700 performed, for example, by a receiver device, in accordance with the present disclosure. Example process 700 is an example where the receiver device (e.g., receiver device 410) performs operations associated with signal modification for control channel physical layer security.

As shown in FIG. 7, in some aspects, process 700 may include receiving, from a transmitting device, a secured physical control channel signal (block 710). For example, the receiver device (e.g., using communication manager 140 and/or reception component 802, depicted in FIG. 8; or communication manager 150 and/or reception component 902, depicted in FIG. 9) may receive, from a transmitting device, a secured physical control channel signal, as described above.

As further shown in FIG. 7, in some aspects, process 700 may include retrieving information from the secured physical control channel signal by modifying, based at least in part on a secrecy key, an input or an output of at least one of OFDM tone mapping, demodulation, or binary unscrambling (block 720). For example, the receiver device (e.g., using communication manager 140 and/or modification component 808, depicted in FIG. 8; or communication manager 150 and/or modification component 908, depicted in FIG. 9) may retrieve information from the secured physical control channel signal by modifying, based at least in part on a secrecy key, an input or an output of at least one of OFDM tone mapping, demodulation, or binary unscrambling, as described above.

Process 700 may include additional aspects, such as any single aspect or any combination of aspects described below and/or in connection with one or more other processes described elsewhere herein.

In a first aspect, modifying the input or the output of the at least one of the OFDM tone mapping, the demodulation, or the binary unscrambling includes initializing a scrambling sequence generator based at least in part on the secrecy key, and the scrambling sequence generator generates a scrambling sequence for the binary unscrambling.

In a second aspect, alone or in combination with the first aspect, initializing a scrambling sequence generator based at least in part on the secrecy key includes initializing a first m-sequence of the scrambling sequence using a first portion of the secrecy key, and initializing a second m-sequence of the scrambling sequence using a second portion of the secrecy key.

In a third aspect, alone or in combination with one or more of the first and second aspects, modifying the input or the output of the at least one of the OFDM tone mapping, the demodulation, or the binary unscrambling includes unmasking scrambled bits to be unscrambled in the binary unscrambling by decrypting the scrambled bits using the secrecy key.

In a fourth aspect, alone or in combination with one or more of the first through third aspects, modifying the at least one of the OFDM tone mapping, the demodulation, or the binary unscrambling includes unmasking scrambled bits to be unscrambled in the binary unscrambling by decrypting the scrambled bits using a first portion of the secrecy key, and unscrambling the scrambled bits based at least in part on a scrambling sequence generated by a scrambling sequence generator initialized using a second portion of the secrecy key.

In a fifth aspect, alone or in combination with one or more of the first through fourth aspects, modifying the input or the output of the at least one of the OFDM tone mapping, the demodulation, or the binary unscrambling includes unmasking output bits from the demodulation by decrypting the output bits from the demodulation using the secrecy key.

In a sixth aspect, alone or in combination with one or more of the first through fifth aspects, modifying the input or the output of the at least one of the OFDM tone mapping, the demodulation, or the binary unscrambling includes swapping real and imaginary parts associated with constellation points for QAM or QPSK demodulation based at least in part on the secrecy key.

In a seventh aspect, alone or in combination with one or more of the first through sixth aspects, modifying the input or the output of the at least one of the OFDM tone mapping, the demodulation, or the binary unscrambling includes modifying QAM or QPSK symbols for QAM or QPSK demodulation by a phase shift generated based at least in part on the secrecy key.

In an eighth aspect, alone or in combination with one or more of the first through seventh aspects, modifying the input or the output of the at least one of the OFDM tone mapping, the demodulation, or the binary unscrambling includes rotating QAM or QPSK symbols for QAM or QPSK demodulation based at least in part on the secrecy key.

In a ninth aspect, alone or in combination with one or more of the first through eighth aspects, modifying the input or the output of the at least one of the OFDM tone mapping, the demodulation, or the binary unscrambling includes unscrambling, based at least in part on the secrecy key, OFDM tones to be mapped to QAM or QPSK symbols in the OFDM tone mapping.

In a tenth aspect, alone or in combination with one or more of the first through ninth aspects, modifying the input or the output of the at least one of the OFDM tone mapping, the demodulation, or the binary unscrambling includes modifying an input or output of the binary unscrambling based at least in part on a first secrecy key, modifying an input or output of the demodulation based at least in part on a second secrecy key, and modifying an input or output of the OFDM tone mapping based at least in part on a third secrecy key.

In an eleventh aspect, alone or in combination with one or more of the first through tenth aspects, the receiver device is a user equipment, the transmitter device is a base station, and the physical control channel signal is a physical downlink control channel signal or a physical broadcast control channel signal.

In a twelfth aspect, alone or in combination with one or more of the first through eleventh aspects, the receiver device is a base station, the transmitter device is a user equipment, and the physical control channel signal is a physical uplink control channel signal.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
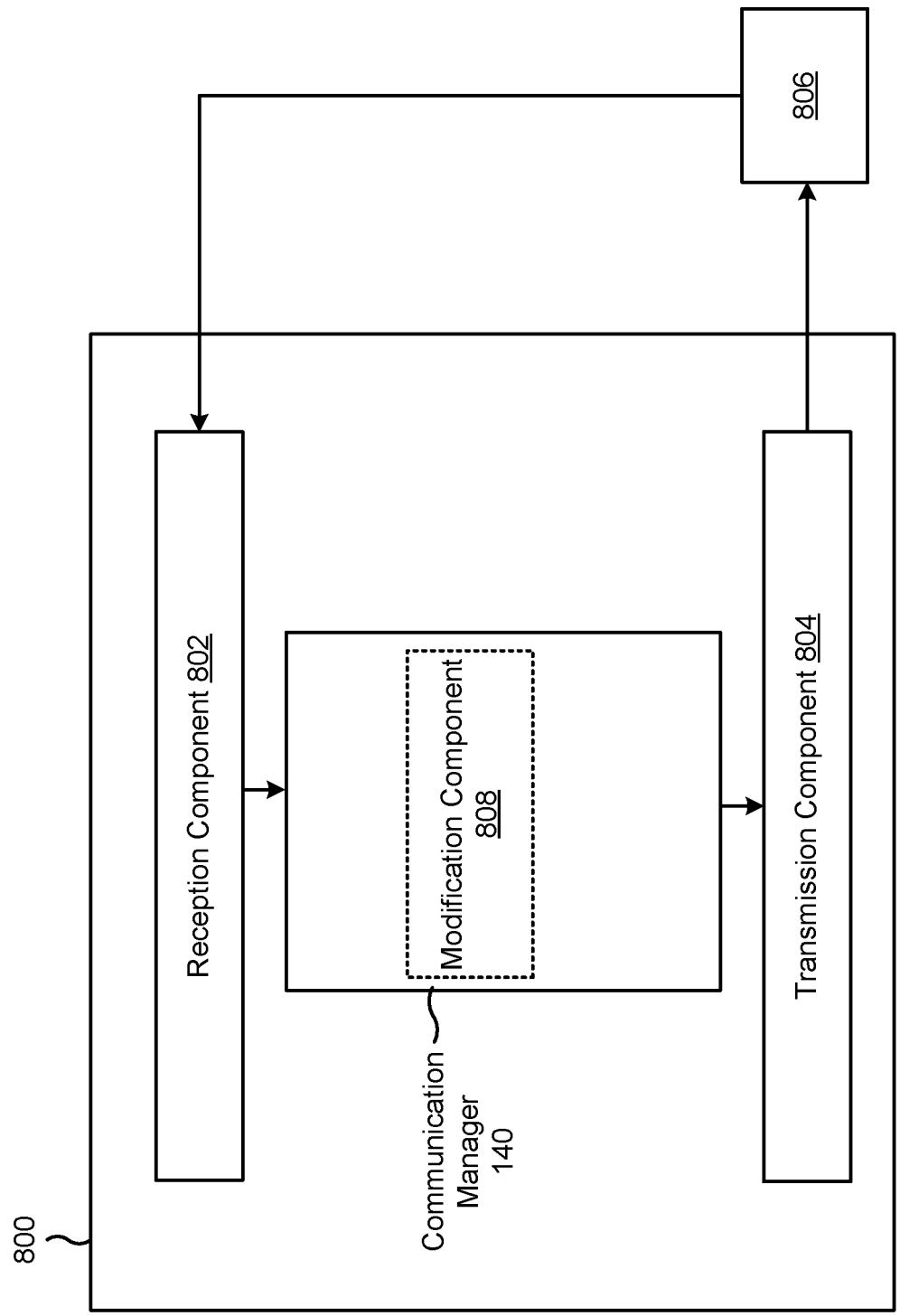
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may a modification component 808.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The modification component 808 may modify, based at least in part on a secrecy key, an input or an output of at least one of binary scrambling, modulation, or OFDM tone mapping for a physical control channel signal, resulting in a secured physical control channel signal. The transmission component 804 may transmit, to a receiver device, the secured physical control channel signal.

The reception component 802 may receive, from a transmitting device, a secured physical control channel signal. The modification component 808 may retrieve information from the secured physical control channel signal by modifying, based at least in part on a secrecy key, an input or an output of at least one of OFDM tone mapping, demodulation, or binary unscrambling.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
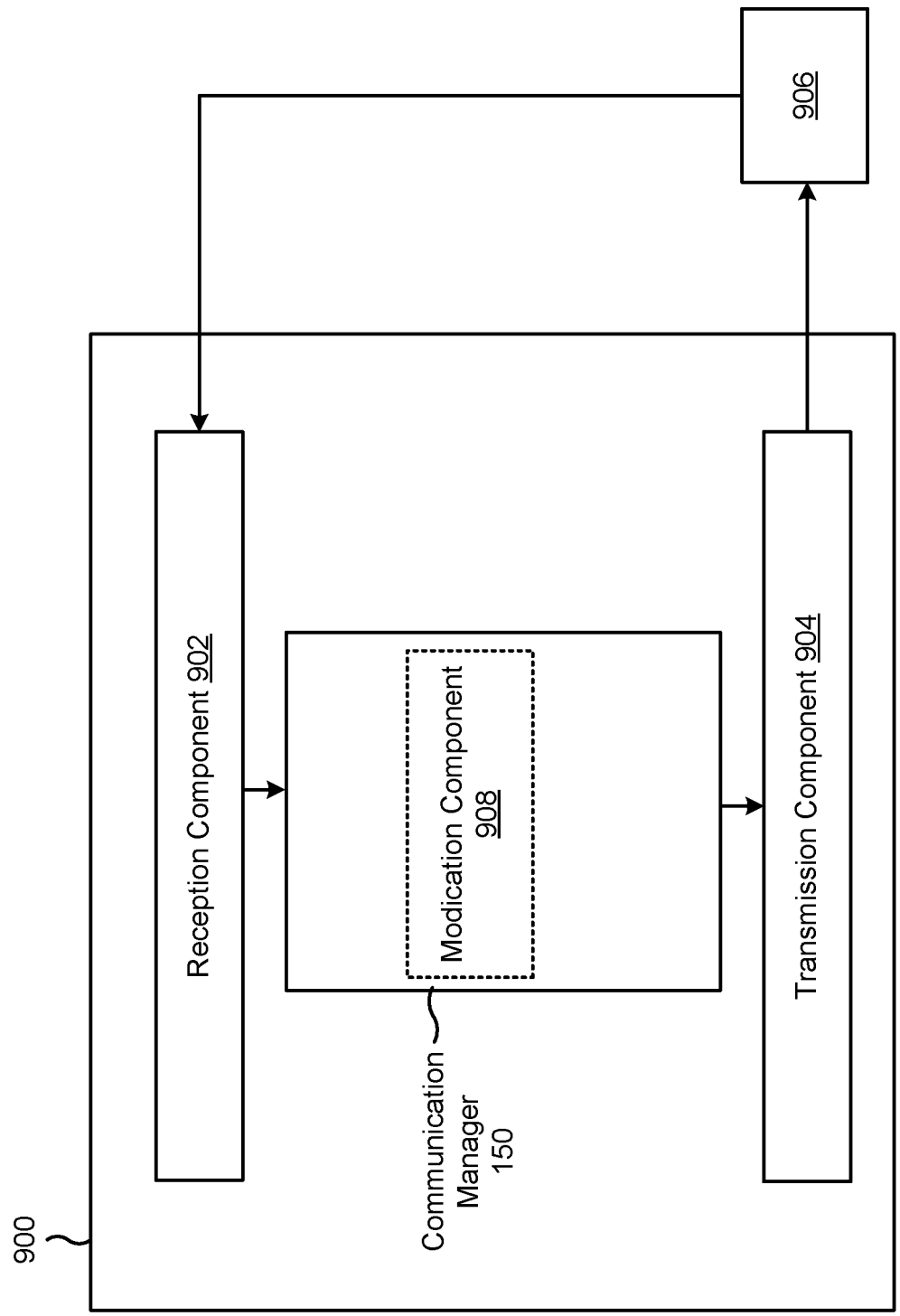

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a modification component 908, among other examples.

In some aspects, the apparatus 900 may be configured to perform one or more operations described herein in connection with FIGS. 4-5. Additionally, or alternatively, the apparatus 900 may be configured to perform one or more processes described herein, such as process 600 of FIG. 6, process 700 of FIG. 7, or a combination thereof. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The modification component 908 may modify, based at least in part on a secrecy key, an input or an output of at least one of binary scrambling, modulation, or OFDM tone mapping for a physical control channel signal, resulting in a secured physical control channel signal. The transmission component 904 may transmit, to a receiver device, the secured physical control channel signal.

The reception component 902 may receive, from a transmitting device, a secured physical control channel signal. The modification component 908 may retrieve information from the secured physical control channel signal by modifying, based at least in part on a secrecy key, an input or an output of at least one of OFDM tone mapping, demodulation, or binary unscrambling.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a transmitter device, comprising: modifying, based at least in part on a secrecy key, an input or an output of at least one of binary scrambling, modulation, or orthogonal frequency division multiplexing (OFDM) tone mapping for a physical control channel signal, resulting in a secured physical control channel signal; and transmitting, to a receiver device, the secured physical control channel signal.

Aspect 2: The method of Aspect 1, wherein modifying the input or the output of the at least one of the binary scrambling, the modulation, or the OFDM tone mapping comprises: initializing a scrambling sequence generator based at least in part on the secrecy key, wherein the scrambling sequence generator generates a scrambling sequence for the binary scrambling.

Aspect 3: The method of Aspect 2, wherein initializing the scrambling sequence generator based at least in part on the secrecy key comprises: initializing a first m-sequence of the scrambling sequence using a first portion of the secrecy key; and initializing a second m-sequence of the scrambling sequence using a second portion of the secrecy key.

Aspect 4: The method of any of Aspects 1-3, wherein modifying the input or the output of the at least one of the binary scrambling, the modulation, or the OFDM tone mapping comprises: masking scrambled bits resulting from the binary scrambling by encrypting the scrambled bits using the secrecy key.

Aspect 5: The method of any of Aspects 1-4, wherein modifying the input or the output of the at least one of the binary scrambling, the modulation, or the OFDM tone mapping comprises initializing a scrambling sequence generator based at least in part on a first portion of the secrecy key, wherein the scrambling sequence generator generates a scrambling sequence for the binary scrambling; and masking scrambled bits resulting from the binary scrambling by encrypting the scrambled bits using a second portion of the secrecy key.

Aspect 6: The method of any of Aspects 1-5, wherein modifying the input or the output of the at least one of the binary scrambling, the modulation, or the OFDM tone mapping comprises: masking input bits to the modulation by encrypting the input bits to the modulation using the secrecy key.

Aspect 7: The method of any of Aspects 1-6, wherein modifying the input or the output of the at least one of the binary scrambling, the modulation, or the OFDM tone mapping comprises: swapping real and imaginary parts associated with constellation points for quadrature amplitude modulation (QAM) or quadrature phase shift keying (QPSK) modulation based at least in part on the secrecy key.

Aspect 8: The method of any of Aspects 1-7, wherein modifying the input or the output of the at least one of the binary scrambling, the modulation, or the OFDM tone mapping comprises: modifying quadrature amplitude modulation (QAM) or quadrature phase shift keying (QPSK) symbols resulting from QAM or QPSK modulation by a phase shift generated based at least in part on the secrecy key.

Aspect 9: The method of any of Aspects 1-8, wherein modifying the input or the output of the at least one of the binary scrambling, the modulation, or the OFDM tone mapping comprises: rotating quadrature amplitude modulation (QAM) or quadrature phase shift keying (QPSK) symbols resulting from QAM or QPSK modulation based at least in part on the secrecy key.

Aspect 10: The method of any of Aspects 1-9, wherein modifying the input or the output of the at least one of the binary scrambling, the modulation, or the OFDM tone mapping comprises: re-mapping OFDM tones resulting from the OFDM tone mapping based at least in part on the secrecy key.

Aspect 11: The method of any of Aspects 1-10, wherein modifying the input or the output of the at least one of the binary scrambling, the modulation, or the OFDM tone mapping comprises: modifying an input or output of the binary scrambling based at least in part on a first secrecy key; modifying an input or output of the modulation based at least in part on a second secrecy key; and modifying an input or output of the OFDM tone mapping based at least in part on a third secrecy key.

Aspect 12: The method of any of Aspects 1-11, wherein the transmitter device is a base station, the receiver device is a user equipment, and the physical control channel signal is a physical downlink control channel signal or a physical broadcast control channel signal.

Aspect 13: The method of any of Aspects 1-11, wherein the transmitter device is a user equipment, the receiver device is a base station, and the physical control channel signal is a physical uplink control channel signal.

Aspect 14: A method of wireless communication performed by a receiver device, comprising: receiving, from a transmitting device, a secured physical control channel signal; and retrieving information from the secured physical control channel signal by modifying, based at least in part on a secrecy key, an input or an output of at least one of orthogonal frequency division multiplexing (OFDM) tone mapping, demodulation, or binary unscrambling.

Aspect 15: The method of Aspect 14, wherein modifying the input or the output of the at least one of the OFDM tone mapping, the demodulation, or the binary unscrambling comprises initializing a scrambling sequence generator based at least in part on the secrecy key, wherein the scrambling sequence generator generates a scrambling sequence for the binary unscrambling.

Aspect 16: The method of Aspect 15, wherein initializing the scrambling sequence generator based at least in part on the secrecy key comprises: initializing a first m-sequence of the scrambling sequence using a first portion of the secrecy key; and initializing a second m-sequence of the scrambling sequence using a second portion of the secrecy key.

Aspect 17: The method of any of Aspects 14-16, wherein modifying the input or the output of the at least one of the OFDM tone mapping, the demodulation, or the binary unscrambling comprises: unmasking scrambled bits to be unscrambled in the binary unscrambling by decrypting the scrambled bits using the secrecy key.

Aspect 18: The method of any of Aspects 14-17, wherein modifying the at least one of the OFDM tone mapping, the demodulation, or the binary unscrambling comprises: unmasking scrambled bits to be unscrambled in the binary unscrambling by decrypting the scrambled bits using a first portion of the secrecy key; and unscrambling the scrambled bits based at least in part on a scrambling sequence generated by a scrambling sequence generator initialized using a second portion of the secrecy key.

Aspect 19: The method of any of Aspects 14-18, wherein modifying the input or the output of the at least one of the OFDM tone mapping, the demodulation, or the binary unscrambling comprises: unmasking output bits from the demodulation by decrypting the output bits from the demodulation using the secrecy key.

Aspect 20: The method of any of Aspects 14-19, wherein modifying the input or the output of the at least one of the OFDM tone mapping, the demodulation, or the binary unscrambling comprises: swapping real and imaginary parts associated with constellation points for quadrature amplitude modulation (QAM) or quadrature phase shift keying (QPSK) demodulation based at least in part on the secrecy key.

Aspect 21: The method of any of Aspects 14-20, wherein modifying the input or the output of the at least one of the OFDM tone mapping, the demodulation, or the binary unscrambling comprises: modifying quadrature amplitude modulation (QAM) or quadrature phase shift keying (QPSK) symbols for QAM or QPSK demodulation by a phase shift generated based at least in part on the secrecy key.

Aspect 22: The method of any of Aspects 14-21, wherein modifying the input or the output of the at least one of the OFDM tone mapping, the demodulation, or the binary unscrambling comprises: rotating quadrature amplitude modulation (QAM) or quadrature phase shift keying (QPSK) symbols for QAM or QPSK demodulation based at least in part on the secrecy key.

Aspect 23: The method of any of Aspects 14-22, wherein modifying the input or the output of the at least one of the OFDM tone mapping, the demodulation, or the binary unscrambling comprises: unscrambling, based at least in part on the secrecy key, OFDM tones to be mapped to quadrature amplitude modulation (QAM) or quadrature phase shift keying (QPSK) symbols in the OFDM tone mapping.

Aspect 24: The method of any of Aspects 14-23, wherein modifying the input or the output of the at least one of the OFDM tone mapping, the demodulation, or the binary unscrambling comprises: modifying an input or output of the binary unscrambling based at least in part on a first secrecy key; modifying an input or output of the demodulation based at least in part on a second secrecy key; and modifying an input or output of the OFDM tone mapping based at least in part on a third secrecy key.

Aspect 25: The method of any of Aspects 14-24, wherein the receiver device is a user equipment, the transmitter device is a base station, and the physical control channel signal is a physical downlink control channel signal or a physical broadcast control channel signal.

Aspect 26: The method of any of Aspects 14-24, wherein the receiver device is a base station, the transmitter device is a user equipment, and the physical control channel signal is a physical uplink control channel signal.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: An apparatus for wireless communication at a device, comprising a processor; memory coupled with the processor; and instructions stored in the memory and executable by the processor to cause the apparatus to perform the method of one or more of Aspects 14-26.

Aspect 29: A device for wireless communication, comprising a memory and one or more processors coupled to the memory, the one or more processors configured to perform the method of one or more of Aspects 1-13.

Aspect 30: A device for wireless communication, comprising a memory and one or more processors coupled to the memory, the one or more processors configured to perform the method of one or more of Aspects 14-26.

Aspect 31: An apparatus for wireless communication, comprising at least one means for performing the method of one or more of Aspects 1-13.

Aspect 32: An apparatus for wireless communication, comprising at least one means for performing the method of one or more of Aspects 14-26.

Aspect 33: A non-transitory computer-readable medium storing code for wireless communication, the code comprising instructions executable by a processor to perform the method of one or more of Aspects 1-13.

Aspect 34: A non-transitory computer-readable medium storing code for wireless communication, the code comprising instructions executable by a processor to perform the method of one or more of Aspects 14-26.

Aspect 35: A non-transitory computer-readable medium storing a set of instructions for wireless communication, the set of instructions comprising one or more instructions that, when executed by one or more processors of a device, cause the device to perform the method of one or more of Aspects 1-13.

Aspect 36: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter device for wireless communication, comprising:
one or more memories; and
one or more processors, coupled to the one or more memories, collectively or individually configured to:
modify, based at least in part on a secrecy key, an output of orthogonal frequency division multiplexing (OFDM) tone mapping for a physical control channel signal, resulting in a secured physical control channel signal; and
transmit, to a receiver device, the secured physical control channel signal.

2. The transmitter device of claim 1, wherein the one or more processors are further configured to:
initialize a scrambling sequence generator based at least in part on a second secrecy key, wherein the scrambling sequence generator generates a scrambling sequence for binary scrambling.

3. The transmitter device of claim 2, wherein the one or more processors, to initialize the scrambling sequence generator based at least in part on the second secrecy key, are configured to:
initialize a first m-sequence of the scrambling sequence using a first portion of the second secrecy key; and
initialize a second m-sequence of the scrambling sequence using a second portion of the second secrecy key.

4. The transmitter device of claim 1, wherein the one or more processors are further configured to:
mask scrambled bits resulting from binary scrambling by encrypting the scrambled bits using a second secrecy key.

5. The transmitter device of claim 1, wherein the one or more processors are further configured to:
initialize a scrambling sequence generator based at least in part on a first portion of a second secrecy key, wherein the scrambling sequence generator generates a scrambling sequence for binary scrambling; and
mask scrambled bits resulting from the binary scrambling by encrypting the scrambled bits using a second portion of the second secrecy key.

6. The transmitter device of claim 1, wherein the one or more processors are further configured to:
mask input bits to a modulation by encrypting the input bits to the modulation using a second secrecy key.

7. The transmitter device of claim 1, wherein the one or more processors are further configured to:
swap real and imaginary parts associated with constellation points for quadrature amplitude modulation (QAM) or quadrature phase shift keying (QPSK) modulation based at least in part on a second secrecy key.

8. The transmitter device of claim 1, wherein the one or more processors are further configured to:
modify quadrature amplitude modulation (QAM) or quadrature phase shift keying (QPSK) symbols resulting from QAM or QPSK modulation by a phase shift generated based at least in part on a second secrecy key.

9. The transmitter device of claim 1, wherein the one or more processors are further configured to:
rotate quadrature amplitude modulation (QAM) or quadrature phase shift keying (QPSK) symbols resulting from QAM or QPSK modulation based at least in part on a second secrecy key.

10. The transmitter device of claim 1, wherein the one or more processors, to modify the output of the OFDM tone mapping, are configured to:
re-map OFDM tones resulting from the OFDM tone mapping based at least in part on the secrecy key.

11. The transmitter device of claim 1, wherein the one or more processors are further configured to:
modify an input or output of a binary scrambling based at least in part on a second secrecy key; and modify an input or output of a modulation based at least in part on a third secrecy key.

12. The transmitter device of claim 1, wherein the transmitter device is a base station, the receiver device is a user equipment, and the physical control channel signal is a physical downlink control channel signal or a physical broadcast control channel signal.

13. The transmitter device of claim 1, wherein the transmitter device is a user equipment, the receiver device is a base station, and the physical control channel signal is a physical uplink control channel signal.

14. A receiver device for wireless communication, comprising:
one or more memories; and
one or more processors, coupled to the one or more memories, collectively or individually configured to:
receive, from a transmitting device, a secured physical control channel signal; and
retrieve information from the secured physical control channel signal by modifying, based at least in part on a secrecy key, an input of orthogonal frequency division multiplexing (OFDM) tone mapping.

15. The receiver device of claim 14, wherein the one or more processors are further configured to:
initialize a scrambling sequence generator based at least in part on a second secrecy key, wherein the scrambling sequence generator generates a scrambling sequence for binary unscrambling.

16. The receiver device of claim 14, wherein the one or more processors are further configured to:
unmask scrambled bits to be unscrambled in binary unscrambling by decrypting the scrambled bits using a second secrecy key.

17. The receiver device of claim 14, wherein the one or more processors are further configured to:
unmask output bits from demodulation by decrypting the output bits from the demodulation using a second secrecy key.

18. The receiver device of claim 14, wherein the one or more processors are further configured to:
swap real and imaginary parts associated with constellation points for quadrature amplitude modulation (QAM) or quadrature phase shift keying (QPSK) demodulation based at least in part on a second secrecy key.

19. The receiver device of claim 14, wherein the one or more processors are further configured to:
modify quadrature amplitude modulation (QAM) or quadrature phase shift keying (QPSK) symbols for QAM or QPSK demodulation by a phase shift or a rotation generated based at least in part on a second secrecy key.

20. The receiver device of claim 14, wherein the one or more processors, to modify the input of the OFDM tone mapping, are configured to:
unscramble, based at least in part on the secrecy key, OFDM tones to be mapped to quadrature amplitude modulation (QAM) or quadrature phase shift keying (QPSK) symbols in the OFDM tone mapping.

21. The receiver device of claim 14, wherein the one or more processors are further configured to:
modify an input or output of a binary unscrambling based at least in part on a second secrecy key; and
modify an input or output of a demodulation based at least in part on a third secrecy key.

22. A method of wireless communication performed by a transmitter device, comprising:
modifying, based at least in part on a secrecy key, an output of orthogonal frequency division multiplexing (OFDM) tone mapping for a physical control channel signal, resulting in a secured physical control channel signal; and
transmitting, to a receiver device, the secured physical control channel signal.

23. The method of claim 22, further comprising:
initializing a scrambling sequence generator based at least in part on a second secrecy key, wherein the scrambling sequence generator generates a scrambling sequence for binary scrambling.

24. The method of claim 22, further comprising:
masking scrambled bits resulting from binary scrambling by encrypting the scrambled bits using a second secrecy key.

25. The method of claim 22, further comprising:
modifying quadrature amplitude modulation (QAM) or quadrature phase shift keying (QPSK) symbols resulting from QAM or QPSK modulation by a phase shift or a rotation generated based at least in part on a second secrecy key.

26. The method of claim 22, wherein modifying the output of the OFDM tone mapping comprises:
re-mapping OFDM tones resulting from the OFDM tone mapping based at least in part on the secrecy key.

27. A method of wireless communication performed by a receiver device, comprising:
receiving, from a transmitting device, a secured physical control channel signal; and
retrieving information from the secured physical control channel signal by modifying, based at least in part on a secrecy key, an input of orthogonal frequency division multiplexing (OFDM) tone mapping.

28. The method of claim 27, further comprising:
initializing a scrambling sequence generator based at least in part on a second secrecy key, wherein the scrambling sequence generator generates a scrambling sequence for binary unscrambling.

29. The method of claim 27, further comprising:
modifying quadrature amplitude modulation (QAM) or quadrature phase shift keying (QPSK) symbols for QAM or QPSK demodulation by a phase shift or a rotation generated based at least in part on a second secrecy key.

30. The method of claim 27, wherein modifying the input of the OFDM tone mapping comprises:
unscrambling, based at least in part on the secrecy key, OFDM tones to be mapped to quadrature amplitude modulation (QAM) or quadrature phase shift keying (QPSK) symbols in the OFDM tone mapping.

* * * * *